United States Patent

Taylor

[11] 3,877,780
[45] Apr. 15, 1975

[54] HEATED REMOTELY CONTROLLED OUTSIDE REARVIEW MIRROR

[75] Inventor: Kendall D. Taylor, Flushing, Mich.

[73] Assignee: General Motors Corporation, Detroit, Mich.

[22] Filed: Sept. 24, 1973

[21] Appl. No.: 400,343

[52] U.S. Cl. ................ 350/63; 74/501 M; 350/307
[51] Int. Cl. ............................................ G02b 5/08
[58] Field of Search .............................. 350/61–64, 350/289, 302, 307; 74/501 M

[56] References Cited
UNITED STATES PATENTS

| | | | |
|---|---|---|---|
| 1,934,998 | 11/1933 | Stahlknecht | 350/63 UX |
| 3,286,545 | 11/1966 | Malachowski | 350/289 X |
| 3,522,584 | 8/1970 | Talbot | 350/61 UX |

Primary Examiner—Ronald L. Wibert
Assistant Examiner—F. L. Evans
Attorney, Agent, or Firm—J. C. Evans

[57] ABSTRACT

A heated remotely controlled outside rearview mirror wherein heated passenger compartment air is induced by aerodynamic flow to and around the mirror element through a flexible conduit surrounding the control cables to thereby remove moisture accumulations on the mirror viewing surface.

3 Claims, 4 Drawing Figures

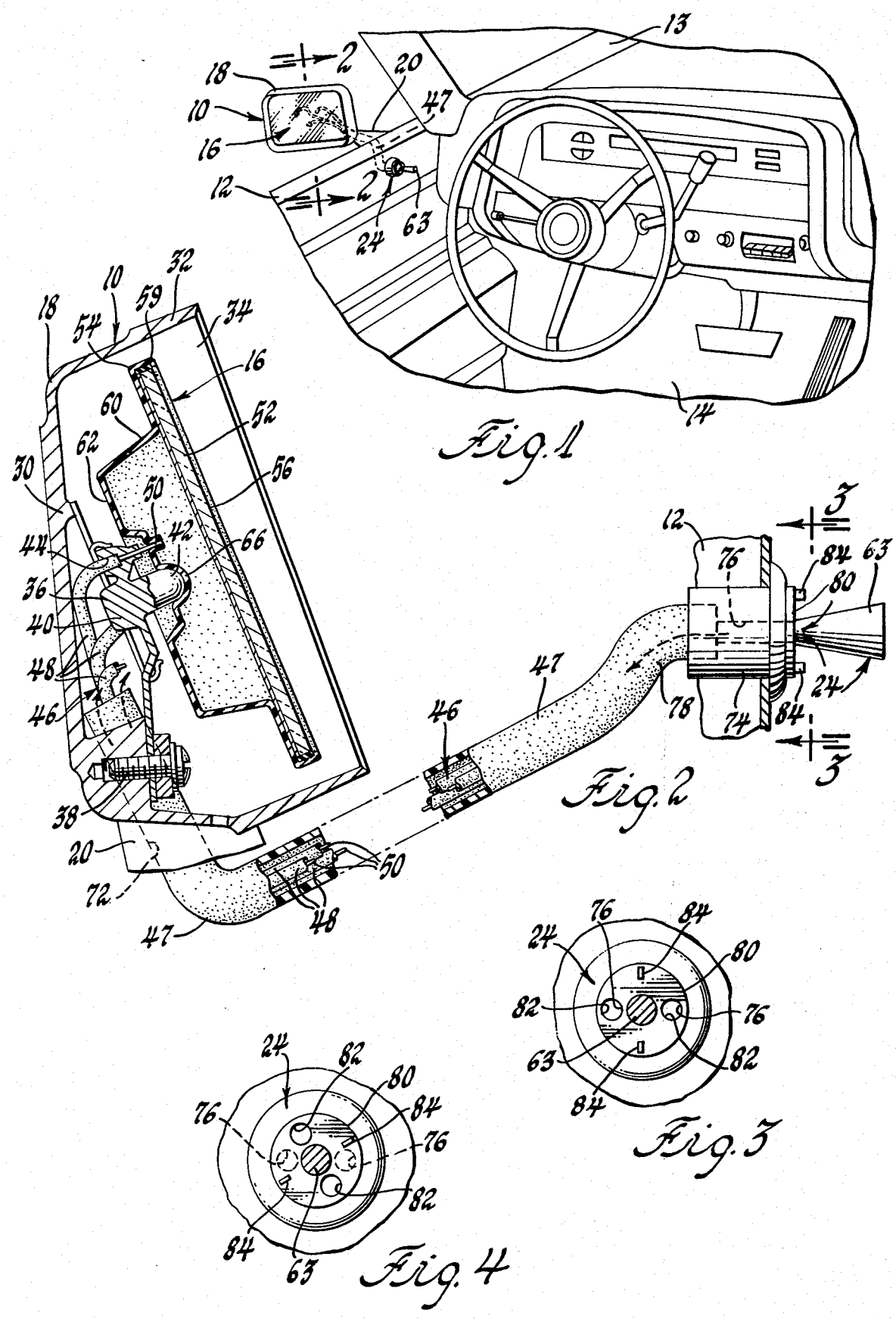

HEATED REMOTELY CONTROLLED OUTSIDE REARVIEW MIRROR

The present invention relates to rearview mirrors, and, in particular, to a heated outside rearview mirror for motor vehicles wherein heated passenger compartment air is routed to the mirror viewing surface for removing moisture accumulations thereon.

When the outside temperature drops below the dew point, the viewing surface of an outside rearview mirror can become clouded, frosted, fogged, or iced. These moisture accumulations can interfere with the visibility provided by the mirror. Prior approaches for remedying such conditions have proposed raising the temperature of the mirror element by electrical or convective heating. While these arrangements have proved satisfactory in some instances, each requires supplemental electrical circuitry or ducts for effecting the desired warmup.

The present invention provides heating of the mirror viewing surface by utilizing existing components of a remotely controlled rearview mirror substantially without alteration. A conventional mirror includes a plurality of control cables running between the mirror and an actuator positioned in a passenger compartment. The cables are partially sheathed in a flexible conduit. In the present invention, the conduit is slightly enlarged in diameter and extends continuously between the mirror cavity and the actuator. This provides a closed air flow passage between air flow ports at the mirror actuator and the mirror cavity. A rotatable flow control disc cooperates with the ports at the actuator to regulate the flow through the sheath. With this arrangement, the aerodynamic flow over the mirror creates a negative pressure differential between the cavity and the passenger compartment. This induces a flow of warm passenger compartment air through the conduit to the mirror cavity. The air flows around the mirror and raises the temperature of the viewing surface sufficiently to expel any moisture accumulations thereon. The heating feature is thus provided by minor revision of existing conduit and actuation.

These and other features of the present invention will be apparent to one skilled in the art upon reading the following detailed description, reference being made to the accompanying drawings illustrating a preferred embodiment in which:

FIG. 1 is a perspective view of a heated remotely controlled outside rearview mirror made in accordance with the present invention mounted on a motor vehicle;

FIG. 2 is an enlarged sectional view taken along line 2—2 of FIG. 1 and including an elevational view of the actuator and flow control disc;

FIG. 3 is a view taken along line 3—3 of FIG. 2 showing the flow control disc in the open position and;

FIG. 4 is a view similar to FIG. 3 showing the flow control disc in the closed position.

Referring to the drawings, there is shown a heated remotely controlled outside rearview mirror 10 made in accordance with the present invention mounted on a door 12 of a motor vehicle 13 exteriorly of the passenger compartment 14. The mirror 10 includes a mirror element 16 supported in a housing 18 carried at the outer end of a support arm 20. The support arm 20 has a base mounted on the exterior sheet metal of the vehicle door 12. The mirror 10 is a conventional remotely controlled device wherein a manual actuator 24 on the inside door panel is controlled by the driver to retract or extend various cables for universally positioning the mirror element 16.

The mirror housing 18 is formed by a suitable process such as diecasting and, as shown in FIG. 2, includes a rear wall 30 and a projecting peripheral rim 32. The inner surfaces of the rear wall 30 and rim 32 define a mirror cavity 34 opening toward the driver. An adjustment bracket 36 is fixedly secured to the rear wall 30 by a fastener 38. The bracket 36 includes a central support post 40 having a spherical tip 42. The bracket 36 is provided with guide openings 44 for receiving three control cables 46 sheathed in an elongated flow conduit 47. Each cable 46 includes a flexible sheath 48 fixedly received in the guide openings 44 and a longitudinally stiff control wire 50 slidably received in the sheath 48.

The mirror element 16 is generally rectangular and comprises a mirror glass 52 and a mirror case 54. The mirror glass 52 has a front reflective surface 56 formed by chrome deposition for providing a field of view to the rear of the vehicle. The mirror when operated in environments where the prevailing outside temperature is below the dew point can have moisture accumulate on the mirror viewing surface. The moisture can take the form of fog, frost or ice. As hereinafter described, heated air from the passenger compartment 13 is aerodynamically induced to flow through the conduit 47 when the vehicle is in motion. The air flows into the cavity 34 around the mirror element 16 and across the reflective surface 56. This raises the temperature of the reflective surface 56 above the dew point and evaporates the moisture accumulations thereon.

The mirror case 54 includes a front rectangular lip 59 which retains the mirror element 16 and a rearward rectangular base portion 60. The base portion 60 has a rear wall 62 including a spherical socket 66. The socket 66 universally engages the spherical tip 42 of the support post 40 to accommodate universal adjustment of the mirror element 16 thereabout.

The wires 50 of the control cables 46 are fixedly attached at spaced locations on the rear wall 62. In a conventional manner, the other ends of the wires 50 are fixedly attached at spaced locations to the remotely controlled actuator 24. The system operates in a conventional manner wherein selective adjustment of a control knob 63 extends or retracts the various wires 50 with respect to the associated sheaths 48 to provide the desired positioning of the mirror element about the ball and socket connection. The specific details of the remotely controlled mechanism constitute no part of the present invention and other actuating units and control units can be provided for achieving the desired orientation of the mirror.

The control cables are sheathed in an air flow conduit 47. The conduit extends continuously between the actuator 24 and support arm 20. The outer end of the conduit 47 is disposed vertically in a passage 72 formed in the support arm 20. The inner diameter of the conduit 47 is sufficiently larger than the control cables 46 so as to loosely surround the latter and provide a free flow passage from the actuator 24 to the cavity 34. The other end of the conduit 47 is retained at the base 74 of the actuator 24.

A pair of axially extending diametrically opposed ports 76 fluidly connect the passenger compartment 14 with the inner end 78 of the conduit 47. A flow control disc 80 is rotatably supported on the front face of the actuator 24. The disc 80 includes a pair of diametrically opposed openings 82 which register with the ports 76. Rotation of the disc 80 is facilitated by projecting tabs 84. In the open position shown in FIG. 3, the openings 82 register with the ports 76 to establish an open flow passage between the passenger compartment 14 and the mirror cavity 34. In the closed position shown in FIG. 4, the disc 80 is rotated with respect to the actuator 24 thereby misaligning the ports 76 and the openings 82 to close off flow from the passenger compartment 14.

When the vehicle is in motion, the aerodynamic flow over the mirror 10 creates a negative pressure differential between the cavity 34 and the passenger compartment 14. With the flow control disc 80 in the open position of FIG. 3, a flow of warm passenger compartment air 14 is induced through the flow passage of the conduit 47 and into the cavity 34 as shown by the arrows. This induced heated air flow is directed to and around the mirror element 16. This raises the temperature of the mirror viewing surface above the dew point thereby removing any moisture accumulations thereon. Once such accumulations have been removed, the disc 80 may be rotated to close the ports 76 until such time as further heating is required.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A heated remotely controlled outside rearview mirror for a motor vehicle comprising: housing means supported on the exterior of said motor vehicle having a cavity formed therein; a mirror element universally adjustably supported on said housing interior of said cavity, said mirror element having a viewing surface on which moisture tends to accumulate; actuator means positioned interior of the vehicle; a plurality of cables operatively connecting said mirror element and said actuator means universally positioning said mirror element in response to movement of said actuator means; conduit means surrounding the cables and forming a direct free passage flow therearound for the flow of air from said interior to said cavity whereby the negative pressure differential between said mirror cavity and said interior when the vehicle is in motion draws air from the interior through said conduit means to said cavity for raising the temperature of said mirror element and evaporating any moisture thereon.

2. A heated outside remotely controlled rearview mirror for a motor vehicle having a passenger compartment comprising: a mirror housing fixedly supported on the exterior of said motor vehicle, said housing having a cavity formed therein opening toward the driver of said vehicle; a mirror element disposed interior of said cavity, said mirror element having a frontal surface on which moisture tends to accumulate; means universally supporting said mirror element on said housing; a cable actuator positioned in the passenger compartment; a plurality of cables having first ends connected to said mirror element and second ends connected to said actuator whereby the driver of said vehicle can selectively move said cables to universally adjustably position the mirror element relative to said housing; a flexible conduit loosely surrounding said cables forming a free flow passage, said conduit having a first end opening at said cavity and a second end opening at said actuator; port means in said actuator fluidly connecting the passenger compartment with said conduit, said port means and said conduit forming a passage for the flow of air from said passenger compartment to said cavity whereby the negative pressure differential between said mirror cavity and said passenger compartment when the vehicle is in motion draws air from the compartment through said conduit to said cavity for raising the temperature of said mirror element and evaporating any moisture thereon.

3. A heated outside remotely controlled rearview mirror for a motor vehicle having a passenger compartment comprising: a mirror housing fixedly supported on the exterior of said motor vehicle, said housing having a cavity formed therein opening toward the driver of said vehicle and having an exterior contour to produce a negative pressure at the cavity when the vehicle is in motion, a mirror element disposed interior of said cavity, said mirror element having a frontal surface on which moisture tends to accumulate; means universally supporting said mirror element on said housing; a cable actuator positioned in the passenger compartment; said actuator including a base portion on the door with a port therethrough in communication with the passenger compartment, a plurality of cables having first ends connected to said mirror element and second ends connected to said actuator whereby the driver of said vehicle can selectively move said cables to universally adjustably position the mirror element relative to said housing; a flexible conduit loosely surrounding said cables to define a free flow passage in surrounding relationship to said cables, said conduit having a first end opening at said cavity and a second end opening connected to said actuator base; said port in said actuator base fluidly connecting the passenger compartment with said free flow passage in said conduit, said port and said conduit directing flow of air from said passenger compartment to said cavity in response to the negative pressure differential between said mirror cavity and the passenger compartment when the vehicle is in motion for raising the temperature of said mirror element and evaporating any moisture thereon, a disc rotatably supported on said actuator in overlying relationship to said actuator base having openings therein selectively aligned with said port to control air flow from the passenger compartment to said cavity during vehicle motion, and means on said disc accessible from the passenger compartment to facilitate adjustment of said disc with respect to said actuator base.

* * * * *